(12) United States Patent
Duan et al.

(10) Patent No.: US 9,264,901 B2
(45) Date of Patent: Feb. 16, 2016

(54) METHOD, APPARATUS, AND SYSTEM FOR ESTABLISHING DATA CONNECTION

(71) Applicant: Huawei Technologies Co., Ltd., Shenzhen (CN)

(72) Inventors: Yun Duan, Wuhan (CN); Xiuping Jiang, Wuhan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/324,488

(22) Filed: Jul. 7, 2014

(65) Prior Publication Data
US 2015/0004910 A1    Jan. 1, 2015

Related U.S. Application Data

(63) Continuation of application No. PCT/CN2013/086080, filed on Oct. 28, 2013.

(30) Foreign Application Priority Data

Jun. 28, 2013  (CN) .......................... 2013 1 0270387

(51) Int. Cl.
*H04B 7/00* (2006.01)
*H04W 12/06* (2009.01)
(Continued)

(52) U.S. Cl.
CPC .............. *H04W 12/06* (2013.01); *H04L 63/18* (2013.01); *H04W 4/008* (2013.01); *H04W 76/02* (2013.01)

(58) Field of Classification Search
CPC ..... H04W 12/06; H04W 84/18; H04W 88/06; H04M 1/7253
USPC ................................. 455/41.2, 41.1
See application file for complete search history.

(56) References Cited

U.S. PATENT DOCUMENTS

| 2005/0089027 A1* | 4/2005 | Colton ............... H04Q 11/0005 370/380 |
| 2011/0136434 A1* | 6/2011 | Choi ..................... H04W 84/18 455/41.2 |

(Continued)

FOREIGN PATENT DOCUMENTS

| CN | 102547925 A | 7/2012 |
| CN | 102780513 A | 11/2012 |

(Continued)

OTHER PUBLICATIONS

Partial English Translation and Abstract of Chinese Patent Application No. CN102780513A, Jul. 24, 2014, 7 pages.
Partial English Translation and Abstract of Chinese Patent Application No. CN102802156A, Jul. 24, 2014, 9 pages.
Partial English Translation and Abstract of Chinese Patent Application No. CN102833074A, Jul. 24, 2014, 2 pages.

(Continued)

*Primary Examiner* — April G Gonzales
(74) *Attorney, Agent, or Firm* — Conley Rose, P.C.; Grant Rodolph; Nicholas K. Beauleiu

(57) ABSTRACT

A method, an apparatus, and a system for establishing a data connection are disclosed that relate to the field of communications network technologies, and can implement automatic determination of a transmission function by an electronic device and reduce operation steps of enabling a transmission function by a user. A receiver device obtains connection information sent by a transmitter device, and enables a target transmission function according to transmission function priorities obtained in advance, transmission functions of the transmitter device, and transmission functions of the receiver device; and then the receiver device sends an authentication message to the transmitter device through the target transmission function, and establishes a connection of the target transmission function with the transmitter device. Solutions provided are applicable to data transmission.

8 Claims, 8 Drawing Sheets

```
┌─────────────────────────────────────────────────┐
│ A receiver device obtains connection information│
│ of a transmitter device, where the connection   │── 101
│ information includes transmission functions of  │
│ the transmitter device and authentication       │
│ information of the transmission functions       │
└─────────────────────────────────────────────────┘
                        │
                        ▼
┌─────────────────────────────────────────────────┐
│ The receiver device enables a target            │
│ transmission function according to transmission │── 102
│ function priorities obtained in advance, the    │
│ transmission functions of the transmitter       │
│ device, and transmission functions of the       │
│ receiver device                                 │
└─────────────────────────────────────────────────┘
                        │
                        ▼
┌─────────────────────────────────────────────────┐
│ The receiver device sends an authentication     │
│ message to the transmitter device through the   │
│ target transmission function, where the         │── 103
│ authentication message includes the             │
│ authentication information, so that the receiver│
│ device and the transmitter device establish a   │
│ connection of the target transmission function  │
└─────────────────────────────────────────────────┘
```

(51) Int. Cl.
*H04W 4/00* (2009.01)
*H04W 76/02* (2009.01)
*H04L 29/06* (2006.01)

(56) References Cited

U.S. PATENT DOCUMENTS

2012/0154126 A1* 6/2012 Cohn .................. H04L 12/2827
340/10.51
2013/0137368 A1* 5/2013 Jiang .................. H04W 76/023
455/41.1
2013/0167208 A1 6/2013 Shi

FOREIGN PATENT DOCUMENTS

| | | |
|---|---|---|
| CN | 102802156 A | 11/2012 |
| CN | 102833074 A | 12/2012 |
| CN | 103138806 A | 6/2013 |
| CN | 103384369 A | 11/2013 |
| EP | 1885141 A1 | 6/2008 |
| JP | 2003008681 A | 1/2003 |
| JP | 2008172407 A | 7/2008 |
| JP | 2011071602 A | 4/2011 |
| WO | 2012135563 A1 | 10/2012 |

OTHER PUBLICATIONS

Foreign Communication From a Counterpart Application, PCT Application No. PCT/CN2013/086080, International Search Report dated Apr. 3, 2014, 6 pages.
Foreign Communication From a Counterpart Application, PCT Application No. PCT/CN2013/086080, Written Opinion dated Apr. 3, 2014, 7 pages.
Foreign Communication From A Counterpart Application, European Application No. 13834289.4, Extended European Search Report dated Feb. 19, 2015, 5 pages.
Partial English Translation and Abstract of Japanese Patent Application No. JPA2003008681, Oct. 15, 2015, 24 pages.
Partial English Translation and Abstract of Japanese Patent Application No. JPA2008172407, Oct. 15, 2015, 51 pages.
Partial English Translation and Abstract of Japanese Patent Application No. JPA2011071602, Oct. 15, 2015, 30 pages.
Foreign Communication From a Counterpart Application, Japanese Application No. 2015-523410, Japanese Office Action dated Aug. 11, 2015, 3 pages.
Foreign Communication From a Counterpart Application, Japanese Application No. 2015-523410, English Translation of Japanese Office Action dated Aug. 11, 2015, 3 pages.

* cited by examiner

METHOD, APPARATUS, AND SYSTEM FOR ESTABLISHING DATA CONNECTION

CROSS-REFERENCE TO RELATED APPLICATIONS

This application is a continuation of International Application No. PCT/CN2013/086080, filed on Oct. 28, 2013, which claims priority to Chinese Patent Application No. 201310270387.8, filed on Jun. 28, 2013, both of which are hereby incorporated by reference in their entireties.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present invention relates to the field of communications network technologies, and in particular, to a method, an apparatus, and a system for establishing a data connection.

BACKGROUND

A near field wireless communication technology (NFC), also known as near field wireless communication, is a non-contact identification and interconnection technology, which can implement near field wireless communication between a mobile device, a consumer electronic product, a personal computer (PC), and an intelligent control tool. An electronic device can implement file transmission by using the NFC technology.

When two electronic devices transmit a file by using an NFC function, a transmission rate thereof is low, and a transmission distance ranges from 0 centimeter (cm) to 10 cm. The NFC technology is generally used for a file less than 7 kilobytes (KB). Considering limitations on the rate and the transmission distance, in the prior art, a certain association is established through contact of the electronic devices, and both the electronic devices enable, through a contact protocol, the same transmission function such as wireless network direct transmission (e.g., Wireless Fidelity (Wi-Fi) Direct), wireless network (e.g., Wi-Fi), or Bluetooth (BT) to perform pairing and establish a connection, so that the electronic devices can automatically enable the transmission function, and that a user reduces operation steps.

However, after passing NFC authentication, the electronic devices enable the transmission function through a certain protocol, where the protocol enables the same transmission function, and when either one of the electronic devices does not have the transmission function specified by the protocol, data transmission fails.

SUMMARY

Embodiments of the present invention provide a method, an apparatus, and a system for establishing a data connection, which can implement automatic determination of a transmission function by an electronic device and reduce operation steps of enabling the transmission function by a user.

In a first aspect, an embodiment of the present invention provides a method for establishing a data connection, where the method includes: obtaining, by a receiver device, connection information of a transmitter device, where the connection information includes transmission functions of the transmitter device and authentication information of the transmission functions; enabling, by the receiver device, a target transmission function according to transmission function priorities obtained in advance, the transmission functions of the transmitter device, and transmission functions of the receiver device; and sending, by the receiver device, an authentication message to the transmitter device through the target transmission function, where the authentication message includes the authentication information, so that the receiver device and the transmitter device establish a connection of the target transmission function.

In a first possible implementation manner of the first aspect, a method for obtaining the priorities specifically includes: obtaining, by the receiver device, the priorities provided by the transmitter device; or obtaining, by the receiver device, the priorities stored by the receiver device.

According to the first aspect or the first possible implementation manner of the first aspect, a second possible implementation manner of the first aspect is further provided, and in the second possible implementation manner of the first aspect, the obtaining, by the receiver device, the connection information of the transmitter device specifically includes: receiving, by the receiver device, a connection message that is sent by the transmitter device and includes the connection information; or obtaining, by the receiver device, a two-dimensional code that is generated by the transmitter device and includes the connection information.

According to the first aspect or any one of the foregoing possible implementation manners of the first aspect, a third possible implementation manner of the first aspect is further provided, and in the third possible implementation manner of the first aspect, when the obtaining, by the receiver device, the connection information of the transmitter device is specifically receiving, by the receiver device, the connection message that is sent by the transmitter device and includes the connection information, after enabling the target transmission function, and before the sending, by the receiver device, the authentication message to the transmitter device through the target transmission function, the method further includes: sending, by the receiver device, an enable message to the transmitter device, where the enable message includes the target transmission function, so that the transmitter device enables the target transmission function.

According to the second possible implementation manner of the first aspect or the third possible implementation manner of the first aspect, a fourth possible implementation manner of the first aspect is further provided, and in the fourth possible implementation manner of the first aspect, the sending, by the receiver device, the authentication message to the transmitter device through the target transmission function includes: searching, by the receiver device, for a device that has enabled the target transmission function, where the device that has enabled the target transmission function includes the transmitter device; and sending, by the receiver device through the target transmission function, authentication information of the target transmission function to the device that has enabled the target transmission function.

In a second aspect, an embodiment of the present invention provides a method for establishing a data connection, where the method includes: generating, by a transmitter device, connection information, where the connection information includes transmission functions of the transmitter device and authentication information of the transmission functions; providing, by the transmitter device, the connection information to a receiver device; receiving, by the transmitter device, an authentication message sent by the receiver device, where the authentication message includes the authentication information; and establishing, by the transmitter device, a connection of a target transmission function with the receiver device according to the authentication message.

In a first possible implementation manner of the second aspect, the generating, by the transmitter device, the connection information specifically includes: generating, by the transmitter device, a connection message that includes the connection information; or generating, by the transmitter device, a two-dimensional code that includes the connection information, where the two-dimensional code is used for the receiver device to obtain the connection information by scanning.

According to the first possible implementation manner of the second aspect, a second possible implementation manner of the second aspect is further provided, and in the second possible implementation manner of the second aspect, the providing, by the transmitter device, the connection information to the receiver device specifically includes: sending, by the transmitter device, the connection message to the receiver device when the transmitter device generates the connection message; or displaying, by the transmitter device, the two-dimensional code when the transmitter device generates the two-dimensional code.

According to the first possible implementation manner of the second aspect, a third possible implementation manner of the second aspect is further provided, and in the third possible implementation manner of the second aspect, when the generating, by the transmitter device, the connection information is specifically generating, by the transmitter device, the two-dimensional code, before the providing, by the transmitter device, the connection information to the receiver device, the method further includes: enabling, by the transmitter device, the transmission functions; and after the receiving, by the transmitter device, the authentication message sent by the receiver device, the method further includes: restoring, by the transmitter device, transmission function states of the transmission functions except the target transmission function to an initial state.

According to the first possible implementation manner of the second aspect, a fourth possible implementation manner of the second aspect is further provided, and in the fourth possible implementation manner of the second aspect, when the generating, by the transmitter device, the connection information is specifically generating, by the transmitter device, the connection message that includes the connection information, before the receiving, by the transmitter device, the authentication message sent by the receiver device, the method further includes: receiving, by the transmitter device, an enable message sent by the receiver device, where the enable message includes notification information that the receiver device has enabled the target transmission function; and enabling, by the transmitter device, the target transmission function according to the enable message.

According to the second aspect or any one of the foregoing possible implementation manners of the second aspect, a fifth possible implementation manner of the second aspect is further provided, and in the fifth possible implementation manner of the second aspect, the connection information further includes priorities of the transmission functions.

In a third aspect, an embodiment of the present invention provides an apparatus for establishing a data connection, where the apparatus includes: an obtaining module configured to obtain connection information of a transmitter device, where the connection information includes transmission functions of the transmitter device and authentication information of the transmission functions; an enabling module configured to enable a target transmission function according to transmission function priorities obtained in advance, the transmission functions of the transmitter device, and transmission functions of a receiver device; a sending module configured to send an authentication message to the transmitter device through the target transmission function, where the authentication message includes the authentication information; and a connecting module configured to establish a connection of the target transmission function with the transmitter device.

In a first possible implementation manner of the third aspect, the obtaining module is specifically configured to obtain the priorities provided by the transmitter device; and the obtaining module is further configured to obtain the priorities stored by the receiver device.

According to the third aspect or the first possible implementation manner of the third aspect, a second possible implementation manner of the third aspect is further provided, and in the second possible implementation manner of the third aspect, the obtaining module is specifically configured to receive a connection message that is sent by the transmitter device and includes the connection information; and the obtaining module is further configured to obtain a two-dimensional code that is generated by the transmitter device and includes the connection information.

According to the third aspect or any one of the foregoing possible implementation manners of the third aspect, a third possible implementation manner of the third aspect is further provided, and in the third possible implementation manner of the third aspect, the sending module is further configured to send an enable message to the transmitter device, where the enable message includes the target transmission function, so that the transmitter device enables the target transmission function.

According to the second possible implementation manner of the third aspect or the third possible implementation manner of the third aspect, a fourth possible implementation manner of the third aspect is further provided, and in the fourth possible implementation manner of the third aspect, the apparatus further includes: a searching module configured for the receiver device to search for a device that has enabled the target transmission function, where the device that has enabled the target transmission function includes the transmitter device; where the sending module is further configured to send, through the target transmission function, authentication information of the target transmission function to the device that has enabled the target transmission function.

In a fourth aspect, an embodiment of the present invention provides an apparatus for establishing a data connection, where the apparatus includes: a generating module configured to generate connection information and provide the connection information to a providing module, where the connection information includes transmission functions of a transmitter device and authentication information of the transmission functions; the providing module configured to provide the connection information to a receiver device; a receiving module configured to receive an authentication message sent by the receiver device and provide the authentication message to a connecting module, where the authentication message includes the authentication information; and the connecting module configured to establish a connection of a target transmission function with the receiver device according to the authentication message.

In a first possible implementation manner of the fourth aspect, the generating module is specifically configured for the transmitter device to generate a connection message that includes the connection information; and the generating module is further configured to generate a two-dimensional code that includes the connection information, where the two-dimensional code is used for the receiver device to obtain the connection information by scanning.

According to the first possible implementation manner of the fourth aspect, a second possible implementation manner of the fourth aspect is further provided, and in the second possible implementation manner of the fourth aspect, the providing module includes: a sending unit configured to send the connection message to the receiver device when the transmitter device generates the connection message; and a displaying unit configured to display the two-dimensional code on a display screen when the transmitter device generates the two-dimensional code.

According to the first possible implementation manner of the fourth aspect, a third possible implementation manner of the fourth aspect is further provided, and in the third possible implementation manner of the fourth aspect, the apparatus further includes: an enabling module configured to enable the transmission functions; and a restoring module configured to restore transmission function states of the transmission functions except the target transmission function to an initial state.

According to the first possible implementation manner of the fourth aspect, a fourth possible implementation manner of the fourth aspect is further provided, and in the fourth possible implementation manner of the fourth aspect, the receiving module is further configured to receive an enable message sent by the receiver device, where the enable message includes notification information that the receiver device has enabled the target transmission function; and the enabling module is further configured to enable the target transmission function according to the enable message.

In a fifth aspect, an embodiment of the present invention provides a system for establishing a data connection, where the system includes a receiver device and a transmitter device, where: the receiver device includes an obtaining module, an enabling module, a sending module, and a connecting module; and the transmitter device includes a generating module, a providing module, a receiving module, and a connecting module; the generating module included in the transmitter device generates connection information, where the connection information includes transmission functions of the transmitter device and authentication information of the transmission functions; the providing module included in the transmitter device provides the connection information to the obtaining module included in the receiver device; the obtaining module included in the receiver device obtains the connection information provided by the providing module included in the transmitter device; the enabling module included in the receiver device enables a target transmission function according to transmission function priorities obtained in advance, states of the transmission functions of the transmitter device, and states of transmission functions of the receiver device; the sending module included in the receiver device sends, through the target transmission function, an authentication message to the receiving module included in the transmitter device, where the authentication message includes the authentication information; the receiving module included in the transmitter device receives the authentication message sent by the sending module included in the receiver device; and the connecting module included in the transmitter device establishes, according to the authentication message, a connection of the target transmission function with the connecting module included in the receiver device.

In the method, apparatus, and system for establishing a data connection according to the embodiments of the present invention, a receiver device obtains connection information sent by a transmitter device, and enables a target transmission function according to transmission function priorities obtained in advance, transmission functions of the transmitter device, and transmission functions of the receiver device; and then the receiver device sends an authentication message to the transmitter device through the target transmission function, and establishes a connection of the target transmission function with the transmitter device. In the prior art, electronic devices enable a transmission function through a certain NFC protocol, where the protocol enables the same transmission function, and when either one of the electronic devices does not have the transmission function specified by the protocol, a problem of a data transmission failure occurs. In comparison, the embodiments of the present invention can implement automatic determination of a transmission function by an electronic device and reduce operation steps of enabling a transmission function by a user, thereby improving user experience.

BRIEF DESCRIPTION OF THE DRAWINGS

To describe the technical solutions in the embodiments of the present invention more clearly, the following briefly introduces the accompanying drawings required for describing the embodiments. The accompanying drawings in the following description show merely some embodiments of the present invention, and a person of ordinary skill in the art may still derive other drawings from these accompanying drawings without creative efforts.

DETAILED DESCRIPTION

The following clearly describes the technical solutions in the embodiments of the present invention with reference to the accompanying drawings in the embodiments of the present invention. The described embodiments are merely a part rather than all of the embodiments of the present invention. All other embodiments obtained by a person of ordinary skill in the art based on the embodiments of the present invention without creative efforts shall fall within the protection scope of the present invention.

Figure 1:
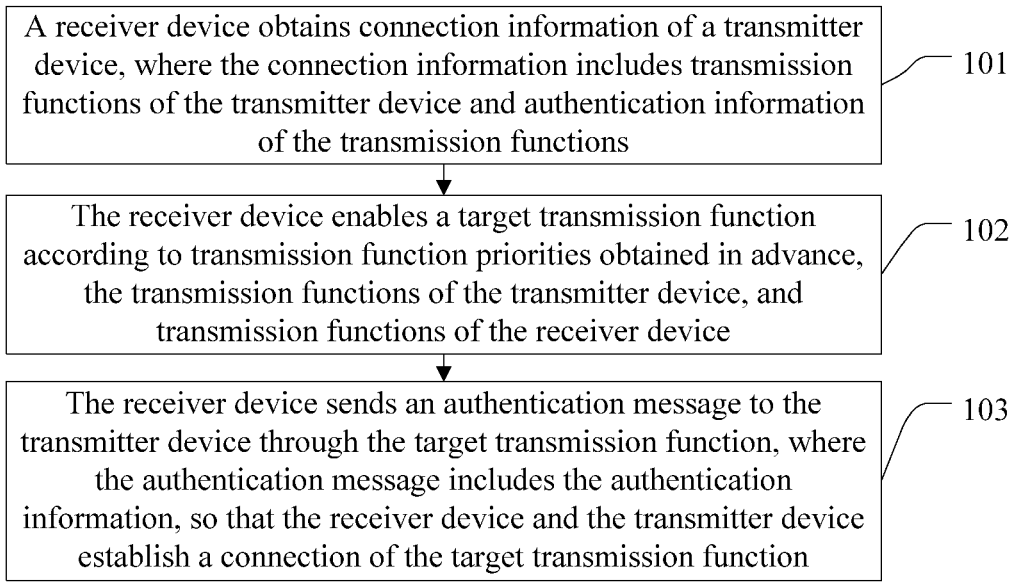
FIG. 1 is a flowchart of a method for establishing a data connection according to an embodiment of the present invention.

As shown in FIG. 1, an embodiment of the present invention provides a method for establishing a data connection, where the method includes the following steps:

Step 101: A receiver device obtains connection information of a transmitter device, where the connection information includes transmission functions of the transmitter device and authentication information of the transmission functions.

The receiver device and the transmitter device may both be an apparatus having transmission functions, such as a mobile phone and a tablet computer. For ease of description, in this embodiment, a mobile phone having transmission functions is used as an example for description.

This embodiment does not limit the transmission functions of the transmitter device. When the transmitter device has one transmission function, the connection information includes one transmission function; and when the transmitter device has at least two transmission functions, the connection information includes the at least two transmission functions (that is, all transmission functions of the transmitter device).

In this embodiment, optionally, the connection information may specifically include names (or identifiers such as codes) of the transmission functions of the transmitter device and the corresponding authentication information. For ease of description, transmission functions including wireless network direct transmission (e.g., Wi-Fi Direct), a wireless network (e.g., Wi-Fi) hotspot, and BT are used as an example for description. The authentication information includes at least passwords corresponding to the transmission functions of the transmitter device.

Step 102: The receiver device enables a target transmission function according to transmission function priorities obtained in advance, the transmission functions of the transmitter device, and transmission functions of the receiver device.

The transmission function priorities may be determined according to transmission rates of the transmission functions. For example, the transmission function priorities are as follows: Wi-Fi Direct has a higher priority than a Wi-Fi hotspot, and the Wi-Fi hotspot has a higher priority than BT.

Specifically, a method for obtaining the priorities includes: obtaining, by the receiver device, the priorities provided by the transmitter device; or obtaining, by the receiver device, the priorities stored by the receiver device. For example, a connection message sent by the transmitter device to the receiver device further includes the priorities (that is, the priorities are priorities of the transmission functions of the transmitter device); or the receiver device obtains priorities of the transmission functions of the receiver device.

The target transmission function is a transmission function of the receiver device. Specifically, for example, the transmission functions of the receiver device include Wi-Fi and BT; and the receiver device preferentially enables Wi-Fi according to the transmission function priorities obtained in advance, that is, a transmission rate of Wi-Fi Direct>a transmission rate of the Wi-Fi hotspot>a transmission rate of BT (the priorities of the transmission functions of the transmitter device), the transmission functions of the transmitter device (Wi-Fi Direct, Wi-Fi, and BT), and the transmission functions of the receiver device (specifically, states of the transmission functions of the receiver device: Wi-Fi and BT are not enabled). Alternatively, the transmission functions of the receiver device include Wi-Fi and BT; and the receiver device preferentially enables BT according to the transmission function priorities obtained in advance, that is, a transmission rate of Wi-Fi>a transmission rate of BT (the priorities of the transmission functions of the receiver device), the transmission functions of the transmitter device (Wi-Fi Direct, Wi-Fi, and BT), and the transmission functions of the receiver device (Wi-Fi is enabled, and BT is not enabled).

Step 103: The receiver device sends an authentication message to the transmitter device through the target transmission function, where the authentication message includes the authentication information, so that the receiver device and the transmitter device establish a connection of the target transmission function.

The authentication information includes at least a code (or an identifier such as a name) and a password of the target transmission function. After the receiver device enables the target transmission function, the receiver device starts to search for a device that has enabled the target transmission function; and when finding the device that has enabled the target transmission function, the receiver device sends, through the target transmission function, authentication information of the target transmission function to the device that has enabled the target transmission function.

In the method for establishing a data connection according to this embodiment of the present invention, a receiver device obtains connection information sent by a transmitter device, and enables a target transmission function according to transmission function priorities obtained in advance, transmission functions of the transmitter device, and transmission functions of the receiver device; and then the receiver device sends an authentication message to the transmitter device through the target transmission function, and establishes a connection of the target transmission function with the transmitter device. In the prior art, electronic devices enable a transmission function through a certain NFC protocol, where the protocol enables the same transmission function, and when either one of the electronic devices does not have the transmission function specified by the protocol, a problem of a data transmission failure occurs. In comparison, this embodiment of the present invention can implement automatic determination of a transmission function by an electronic device and reduce operation steps of enabling a transmission function by a user, thereby improving user experience.

Figure 2:
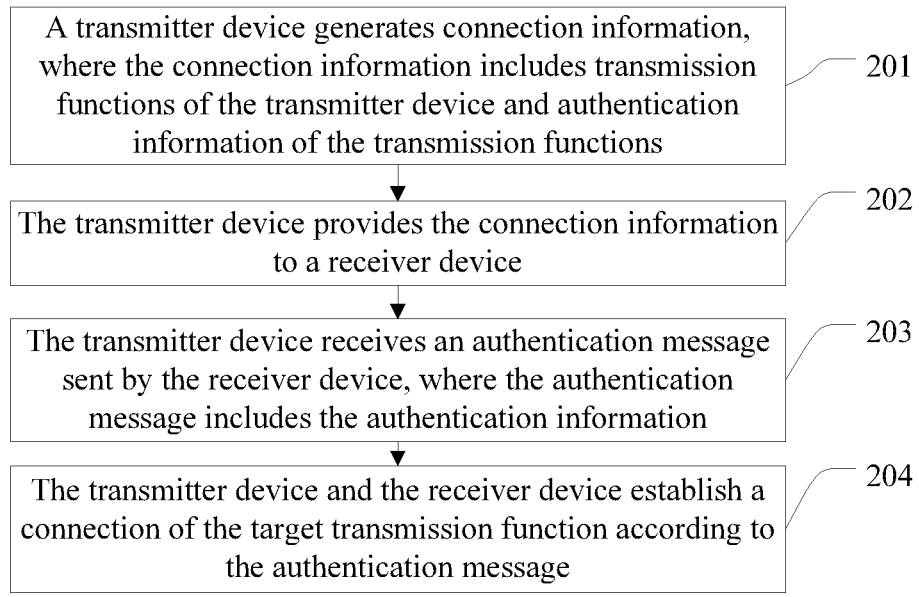
FIG. 2 is a flowchart of another method for establishing a data connection according to an embodiment of the present invention.

As shown in FIG. 2, an embodiment of the present invention provides another method for establishing a data connection, where the method includes the following steps:

Step 201: A transmitter device generates connection information, where the connection information includes transmission functions of the transmitter device and authentication information of the transmission functions.

The transmitter device may be an apparatus having touch transmission functions, such as a mobile phone and a tablet computer. For ease of description, in this embodiment, a mobile phone having transmission functions is used as an example for description.

This embodiment does not limit all the transmission functions of the transmitter device. In this embodiment, optionally, the connection information may specifically include names (or identifiers such as codes) of the transmission functions of the transmitter device and the corresponding authentication information. For ease of description, transmission functions including Wi-Fi Direct, a Wi-Fi hotspot, and BT are used as an example for description.

Specifically, the transmitter device generates a connection message that includes the connection information; or the transmitter device generates a two-dimensional code that includes the connection information, where the two-dimensional code is used for a receiver device to obtain the connection information by scanning.

Step 202: The transmitter device provides the connection information to the receiver device.

Specifically, when the transmitter device generates the connection message, the transmitter device sends the connection message to the receiver device; or when the transmitter device generates the two-dimensional code, the transmitter device displays the two-dimensional code.

Step 203: The transmitter device receives an authentication message sent by the receiver device, where the authentication message includes the authentication information.

Specifically, the authentication message includes authentication information of a target transmission function. The target transmission function is a transmission function in the transmission functions included in the connection information.

The receiver device enables the target transmission function according to the connection information, and then the receiver device sends the authentication message to the transmitter device through the target transmission function.

Step 204: The transmitter device and the receiver device establish a connection of the target transmission function according to the authentication message.

Specifically, after the transmitter device receives the authentication message through the target transmission function, the transmitter device sends an authentication response to the receiver device after detecting that the authentication message is correct, and then the transmitter device and the receiver device establish the connection of the target transmission function, so that the receiver device obtains, through the target transmission function, data to be transmitted in the transmitter device.

In the method for establishing a data connection according to this embodiment of the present invention, a transmitter device generates connection information and provides the connection information to a receiver device, where the connection information includes transmission functions of the transmitter device and authentication information of the transmission functions; then the transmitter device receives an authentication message sent by the receiver device, where the authentication message includes the authentication information; and the transmitter device and the receiver device establish a connection of a target transmission function according to the authentication message. In the prior art, electronic devices enable a transmission function through a certain NFC protocol, where the protocol enables the same transmission function, and when either one of the electronic devices does not have the transmission function specified by the protocol, a problem of a data transmission failure occurs. In comparison, this embodiment of the present invention can implement automatic determination of a transmission function according to transmission functions of the electronic devices to perform data transmission and improve user experience.

Figure 3:
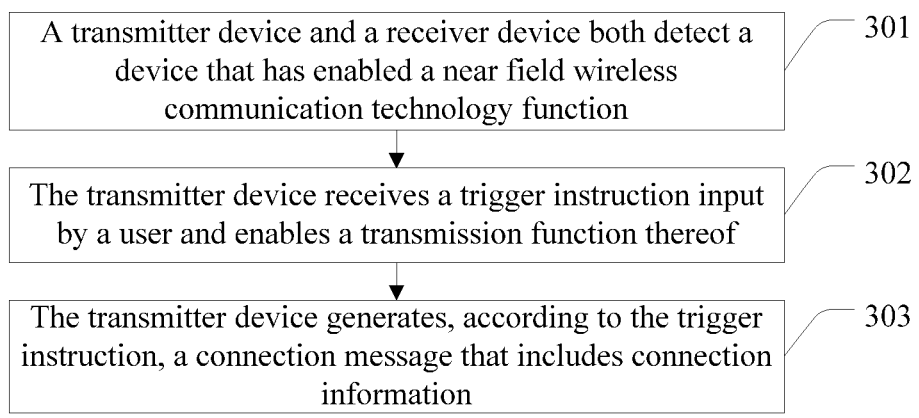
FIG. 3 is a flowchart of a method for a transmitter device to generate connection information in a method for establishing a data connection according to an embodiment of the present invention.

In a method for establishing a data connection according to an embodiment of the present invention, an implementation manner corresponding to step 201 and step 202 in FIG. 2 may be further provided. As shown in FIG. 3, the method includes the following steps:

Step 301: A transmitter device and a receiver device both detect a device that has enabled an NFC function.

After enabling the NFC function, the transmitter device detects the device that has enabled the NFC function, where the device that has enabled the NFC function includes the receiver device. After enabling the NFC function, the receiver device detects the device that has enabled the NFC function.

Step 302: The transmitter device receives a trigger instruction input by a user and enables a transmission function thereof.

After the transmitter device and the receiver device enable the NFC function, when the transmitter device detects that the device that has enabled the NFC function is the receiver device, the transmitter device waits for the trigger instruction input by the user. The trigger instruction includes an instruction that instructs the transmitter device to generate connection information. For example, when the transmitter device and the receiver device both have the NFC function and enable the NFC function, the transmitter device can detect the receiver device when the transmitter device and the receiver device get in contact.

Step 303: The transmitter device generates, according to the trigger instruction, a connection message that includes the connection information.

The trigger instruction includes the instruction that instructs the transmitter device to generate the connection information. The connection information includes transmission functions of the transmitter device and authentication information of the transmission functions; optionally, the connection information may further include priorities of the transmission functions of the transmitter device; optionally, the connection information may further include data information of data to be transmitted. The data information of the data to be transmitted may include a name of the data to be transmitted (or an identifier such as a code of the data to be transmitted), quantity of the data to be transmitted, a path of the data to be transmitted, and the like.

For example, when the transmitter device enables the transmission function thereof by getting in contact with the receiver device, the transmitter device sends the connection information to the receiver device through the NFC function.

Figure 4:
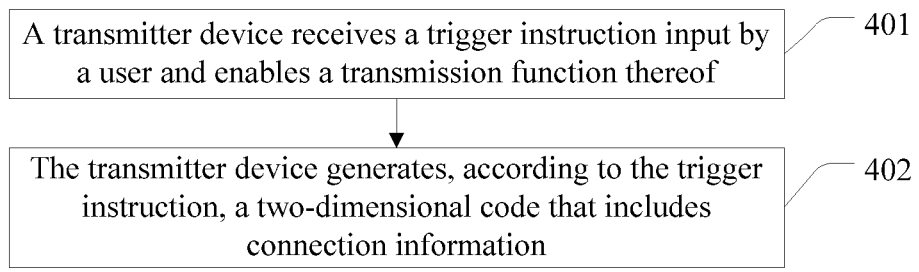
FIG. 4 is a flowchart of another method for a transmitter device to generate connection information in a method for establishing a data connection according to an embodiment of the present invention.

In a method for establishing a data connection according to an embodiment of the present invention, another implementation manner corresponding to step 201 and step 202 in FIG. 2 may be further provided. As shown in FIG. 4, the method includes the following steps:

Step 401: A transmitter device receives a trigger instruction input by a user and enables a transmission function thereof.

Step 402: The transmitter device generates, according to the trigger instruction, a two-dimensional code that includes connection information.

The two-dimensional code is used for a receiver device to obtain the connection information by scanning. For example, when a user holding the transmitter device needs to send a picture to a user holding the receiver device, the user first opens the picture in the transmitter device and then taps a button for generating a two-dimensional code (that is, the user inputs a trigger instruction), and then the transmitter device generates, according to the received trigger instruction, a two-dimensional code that includes the connection information (or the connection information in the generated two-dimensional code further includes priorities of the transmission functions of the transmitter device; or the connection information in the generated two-dimensional code further includes a two-dimensional code of data information to be transmitted in the picture). The receiver device obtains the connection information after scanning the two-dimensional code. Certainly, the transmitter device may also generate the two-dimensional code in other manners. This embodiment does not list all manners for the transmitter device to generate the two-dimensional code.

Figure 5:
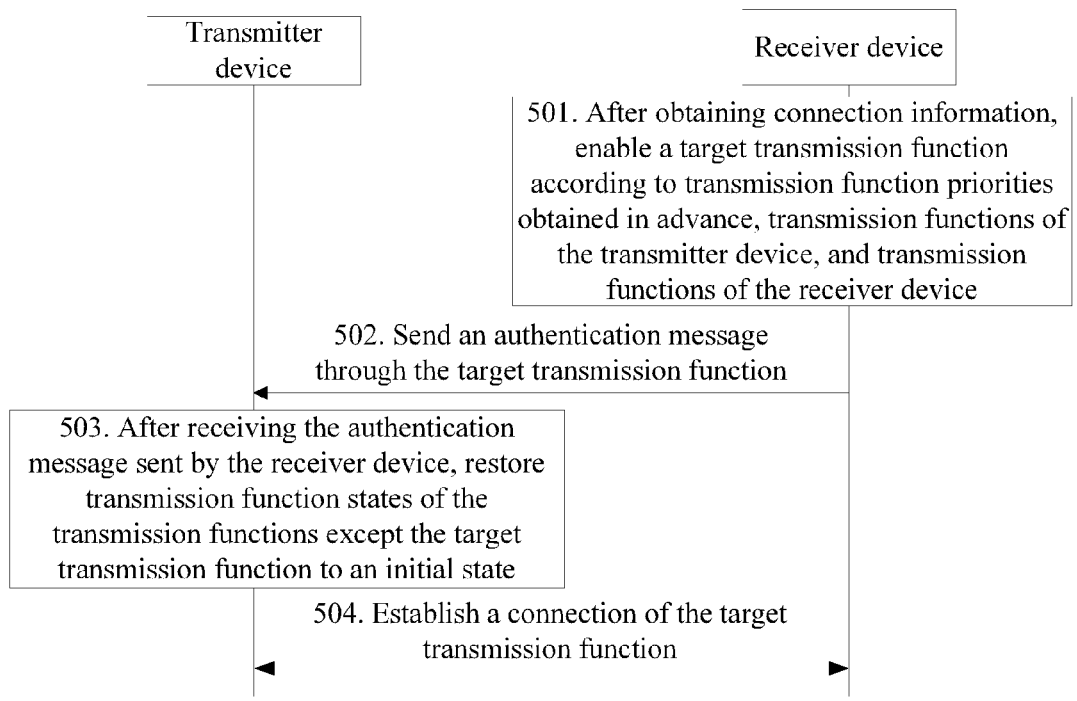
FIG. 5 is a flowchart of still another method for establishing a data connection according to an embodiment of the present invention.

In an implementation manner of an embodiment of the present invention, a method for establishing a data connection is provided. As shown in FIG. 5, the method includes the following steps:

When this embodiment of the present invention is implemented, a transmitter device needs to first perform step 301 to step 303 in FIG. 3, and then continue to perform step 501 after the transmitter device sends a generated connection message that includes connection information to a receiver device; or a transmitter device needs to first perform step 401 and step 402 in FIG. 4, and then continue to perform step 501 after a receiver device obtains (e.g., scans) a two-dimensional code that is generated by the transmitter device and includes connection information.

Step 501: After obtaining connection information, the receiver device enables a target transmission function according to transmission function priorities obtained in advance, transmission functions of the transmitter device, and transmission functions of the receiver device.

It should be noted that, when the receiver device enables the target transmission function according to the transmission function priorities obtained in advance, the transmission functions of the transmitter device, and the transmission functions of the receiver device, when reference is made to the transmission function priorities obtained in advance, enabling the target transmission function is also subject to a relevant constraint according to a constraint on the receiver device. For example, in devices manufactured by some vendors, Wi-Fi Direct and Wi-Fi are associated, that is, when the devices enable Wi-Fi Direct, Wi-Fi is also automatically enabled. However, in devices manufactured by other vendors, Wi-Fi Direct and Wi-Fi may be mutually exclusive, that is, the two cannot be enabled at the same time.

In addition, a Wi-Fi hotspot and Wi-Fi in a device are mutually exclusive. For example, the transmission function priorities obtained by the receiver device in advance are Wi-Fi Direct, Wi-Fi, and BT in sequence; the transmission functions of the transmitter device include Wi-Fi Direct, Wi-Fi, and BT; and the transmission function of the receiver device includes a Wi-Fi hotspot, Wi-Fi, and BT. At this time, the receiver device has enabled the transmission function of the Wi-Fi hotspot. Therefore, the receiver device cannot connect to the transmitter device through Wi-Fi, that is, the receiver device can enable only BT to establish a connection with the transmitter device. It is understandable that, when Wi-Fi Direct and Wi-Fi are associated, Wi-Fi Direct and the Wi-Fi hotspot are in a mutually exclusive relationship.

For example, the transmission functions of the receiver device include the Wi-Fi hotspot, Wi-Fi, and BT. The transmission function priorities obtained by the receiver device in advance are the Wi-Fi hotspot, Wi-Fi, and BT in sequence; and the transmission functions of the transmitter device include Wi-Fi Direct, Wi-Fi, and BT. Therefore, the receiver device should preferentially enable Wi-Fi. However, because the Wi-Fi hotspot and Wi-Fi are mutually exclusive, the receiver device chooses to enable BT.

Step 502: The receiver device sends an authentication message to the transmitter device through the target transmission function.

The authentication message includes at least authentication information corresponding to the target transmission function. The authentication information may include a code (or an identifier such as a name) and a password of the target transmission function. After the receiver device enables the target transmission function, the receiver device starts to search for a device that has enabled the target transmission function; and when finding the device that has enabled the target transmission function, the receiver device sends, through the target transmission function, the authentication information of the target transmission function to the device that has enabled the target transmission function.

Step 503: After receiving the authentication message sent by the receiver device, the transmitter device restores transmission function states of the transmission functions thereof except the target transmission function to an initial state.

Specifically, on condition that the transmitter device does not enable all transmission functions, after the transmitter device and the receiver device perform a trigger operation, all transmission functions of the transmitter device are enabled, and after the transmitter device receives the authentication information that is corresponding to the target transmission function and sent by the receiver device, the transmitter device disables all transmission functions except the target transmission function, so as not to affect normal use of the transmitter device by a user.

It is understandable that the transmitter device performs detection on the authentication message after receiving the authentication message; and the transmitter device sends an authentication response to the receiver device after detecting that the authentication message is correct.

Step 504: The transmitter device and the receiver device establish a connection of the target transmission function.

After the transmitter device and the receiver device establish the connection of the target transmission function, optionally, the transmitter device packs data to be transmitted, and then puts the data package to be transmitted, in a temporary storage area; and the receiver device obtains, according to data information of the data to be transmitted in the connection information and through a path of the data to be transmitted, the data to be transmitted.

It should be noted that, in this embodiment, because the transmitter device has enabled all transmission functions thereof before sending a connection message to the receiver device, in this implementation manner, the receiver device does not need to send an enable message to the transmitter device after enabling the target transmission function. In another implementation manner, the transmitter device has enabled all transmission functions thereof before sending a connection message to the receiver device, but the receiver device may still send an enable message to the transmitter device after enabling the target transmission function, so as to avoid that when the transmitter device does not enable all transmission functions thereof, the receiver device does not send the enable message.

In the method for establishing a data connection according to this embodiment of the present invention, this embodiment of the present invention can achieve the following effect: after both devices perform a trigger operation, a receiver device can enable one transmission function thereof (e.g., a target transmission function) according to transmission functions that are sent by a transmitter device and authentication information of the transmission functions that is sent by the transmitter device, in combination with transmission function priorities obtained in advance, transmission functions of the receiver device, and current states of the transmission functions; and then the receiver device and the transmitter device establish a connection of the target transmission function, thereby improving user experience.

Figure 6:
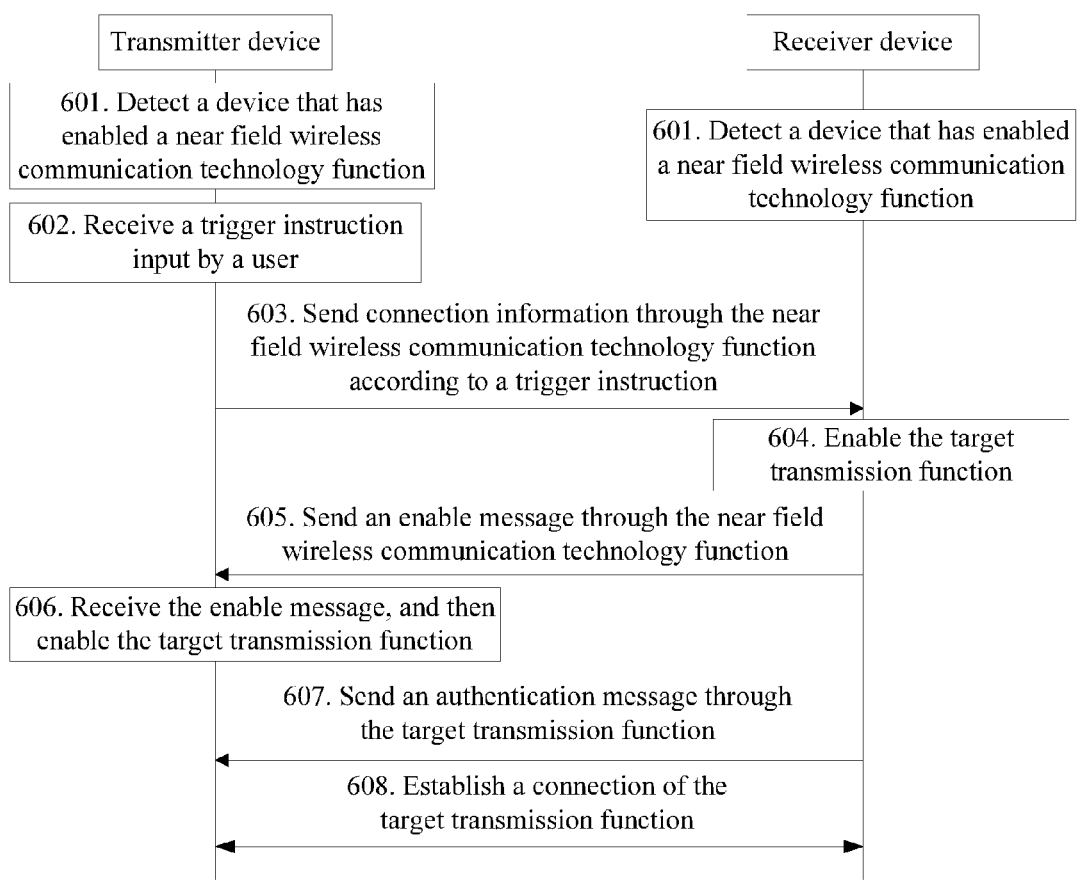
FIG. 6 is a flowchart of still another method for establishing a data connection according to an embodiment of the present invention.

In still another implementation manner of an embodiment of the present invention, a method for establishing a data connection is provided. As shown in FIG. 6, the method includes the following steps:

Step 601: A transmitter device and a receiver device both detect a device that has enabled an NFC function.

Step 602: The transmitter device receives a trigger instruction input by a user.

Step 603: The transmitter device sends connection information to the receiver device through the NFC function according to the trigger instruction.

The connection information includes transmission functions of the transmitter device and authentication information of the transmission functions; optionally, the connection information further includes priorities of the transmission functions of the transmitter device; optionally, the connection information may further include data information of data to be transmitted.

Step 604: The receiver device enables a target transmission function after receiving the connection information sent by the transmitter device.

For detailed description of enabling the target transmission function by the receiver device, reference may be made to step 501 in FIG. 5. Details are not repeated herein.

Step 605: The receiver device sends an enable message to the transmitter device through the NFC function.

The enable message includes notification information that the receiver device has enabled the target transmission function. It should be noted that the receiver device sends the enable message to the transmitter device through a process in which the transmitter device and the receiver device get in contact. For example, when the transmitter device and the receiver device get in contact through the enabled NFC function, the transmitter device first sends connection information to the receiver device, and after the receiver device enables the target transmission function according to the received connection information, the receiver device sends the enable message to the transmitter device.

It is understandable that the enable message includes at least a name of the target transmission function.

Step 606: The transmitter device enables the target transmission function after receiving the enable message sent by the receiver device.

The transmitter device enables, according to the enable message, the target transmission function corresponding to the name of the target transmission function included in the enable message sent by the receiver device. For example, when the receiver device enables Wi-Fi Direct according to the connection information, the enable message sent to the transmitter device includes a name of Wi-Fi Direct, and the transmitter device enables Wi-Fi Direct after receiving the enable message; or when the receiver device enables Wi-Fi according to the connection information, the enable message sent to the transmitter device includes a name of Wi-Fi, and the transmitter device enables a Wi-Fi hotspot after receiving the enable message.

It should be noted that, optionally, when the transmitter device enables the transmission function thereof after receiving the trigger instruction, the transmitter device does not perform any processing after receiving the enable message.

Step 607: The receiver device sends an authentication message to the transmitter device through the target transmission function.

When a time interval from sending the enable message is a preset time, the receiver device starts to search for the device that has enabled the target transmission function; and when finding the device that has enabled the target transmission function, the receiver device sends, through the target transmission function, the authentication message to the device that has enabled the target transmission function, where the authentication message includes the authentication information of the target transmission function. The preset time may be in seconds, and this embodiment does not limit a range of the preset time. For example, the preset time may be 1 second (s), that is, 1 s after the receiver device sends the enable message to the transmitter device, the receiver device starts to search for the device that has enabled the target transmission function. If the receiver device does not find the device that has enabled the target transmission function at this time, or the receiver device does not receive a response from the device after sending the authentication information corresponding to the target transmission function to the device that has enabled the target transmission function, the receiver device may continue to search for a device that has enabled the target transmission function and then send the authentication information corresponding to the target transmission function to the newly found device that has enabled the target transmission function, until the receiver device and the transmitter device are successfully connected.

It should be noted that, optionally, when the transmitter device enables the transmission function thereof after receiving the trigger instruction, the transmitter device may restore states of the transmission functions except the target transmission function to an initial state after receiving the authentication message.

Step 608: The transmitter device and the receiver device establish a connection of the target transmission function.

In the method for establishing a data connection according to this embodiment of the present invention, this embodiment of the present invention can achieve the following effect: After both devices perform a trigger operation, a receiver device can enable one transmission function thereof (e.g., a target transmission function) according to transmission functions that are sent by a transmitter device and authentication information of the transmission functions that is sent by the transmitter device, in combination with transmission function priorities obtained in advance, transmission functions of the receiver device, and current states of the transmission functions; and then the receiver device and the transmitter device establish a connection of the target transmission function, thereby improving user experience.

Figure 7:
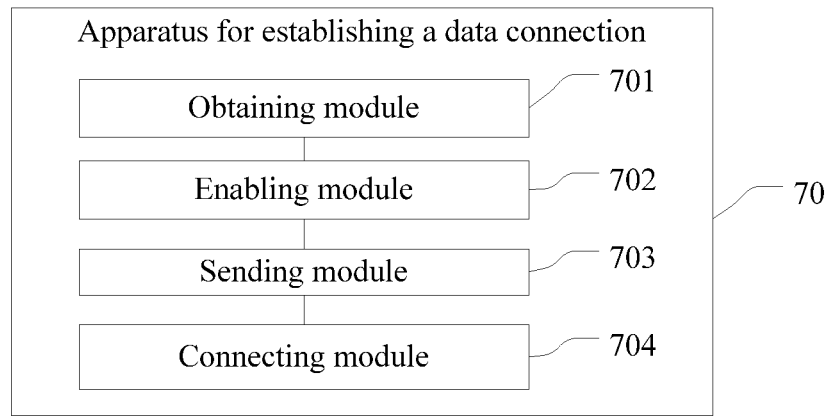
FIG. 7 is a schematic structural diagram of an apparatus for establishing a data connection according to an embodiment of the present invention.

As shown in FIG. 7, an embodiment of the present invention provides an apparatus 70 for establishing a data connection, where the apparatus includes an obtaining module 701, an enabling module 702, a sending module 703, and a connecting module 704. The apparatus may be a receiver device, and specifically, the receiver device may be a device having transmission functions.

The obtaining module 701 is configured to obtain connection information of a transmitter device, where the connection information includes transmission functions of the transmitter device and authentication information of the transmission functions.

The apparatus and the transmitter device may both be an apparatus having touch transmission functions, such as a mobile phone and a tablet computer. For ease of description, in this embodiment, a mobile phone having transmission functions is used as an example for description.

Specifically, the obtaining module 701 may receive a connection message that is sent by the transmitter device and includes the connection information; and/or the obtaining module 701 may further obtain a two-dimensional code that is generated by the transmitter device and includes the connection information.

The enabling module 702 is configured to enable a target transmission function according to transmission function priorities obtained in advance, the transmission functions of the transmitter device, and transmission functions of the receiver device.

The sending module 703 is configured to send an authentication message to the transmitter device through the target transmission function, where the authentication message includes the authentication information.

The connecting module 704 is configured to establish a connection of the target transmission function with the transmitter device.

The authentication information includes at least a code (or an identifier such as a name) and a password of the target transmission function.

Figure 8:
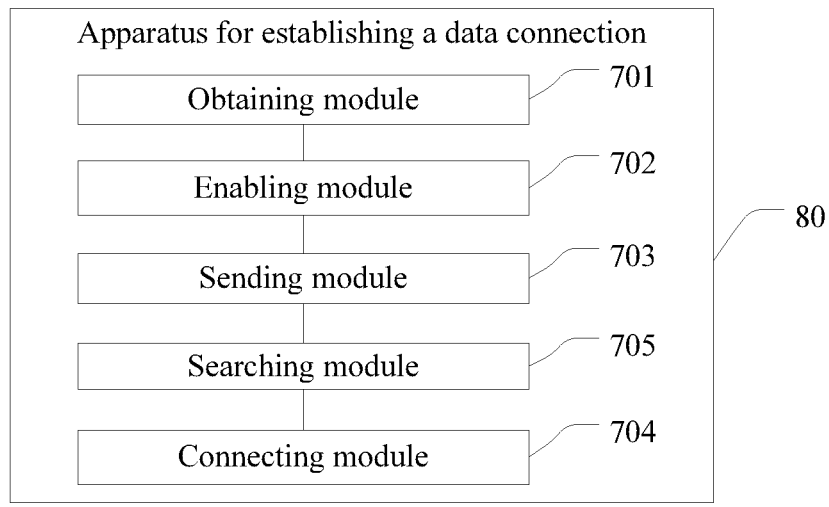
FIG. 8 is a schematic structural diagram of another apparatus for establishing a data connection according to an embodiment of the present invention.

Further, as shown in FIG. 8, an apparatus 80 for establishing a data connection further includes a searching module 705.

Further, the obtaining module 701 may obtain the priorities provided by the transmitter device, and may obtain the priorities stored by the receiver device.

When the transmitter device and the apparatus both have an NFC function, after the enabling module 702 enables the target transmission function, optionally, the sending module 703 sends an enable message to the transmitter device, where the enable message includes that notification information the receiver device has enabled the target transmission function.

The enable message includes notification information that the receiver device has enabled the target transmission function, so that the transmitter device enables the target transmission function according to the enable message.

Further, after the sending module 703 sends the enable message to the transmitter device, the searching module 705 searches for a device that has enabled the target transmission function, where the device that has enabled the target transmission function includes the transmitter device.

Specifically, when a time interval from sending the enable message is a preset time, the searching module 705 starts to search for the device that has enabled the target transmission function; and when the searching module 705 finds the device that has enabled the target transmission function, the sending module 703 sends, through the target transmission function, the authentication information corresponding to the target transmission function to the device that has enabled the target transmission function. The preset time may be in seconds, and the apparatus does not limit a range of the preset time. For example, the preset time may be 1 s, that is, 1 s after the sending module 703 sends the enable message to the transmitter device, the searching module 705 starts to search for the device that has enabled the target transmission function. If the searching module 705 does not find the device that has enabled the target transmission function at this time, or no response is received from the device after the sending module 703 sends the authentication information corresponding to the target transmission function to the device that has enabled the target transmission function, the searching module 705 may continue to search for a device that has enabled the target transmission function, and then the sending module 703 sends the authentication information corresponding to the target transmission function to the newly found device that has enabled the target transmission function, until the apparatus and the transmitter device are successfully connected.

It should be noted that, in the apparatus 70 shown in FIG. 7 and the apparatus 80 shown in FIG. 8, because content such as specific implementation processes of the modules and information interaction between the modules is based on the same inventive idea as the method embodiments of the present invention, reference may be made to the method embodiments, and details are not repeated herein.

The apparatus for establishing a data connection according to this embodiment of the present invention can implement automatic determination of a transmission function according to transmission functions of electronic devices to perform data transmission and improve user experience.

Figure 9:
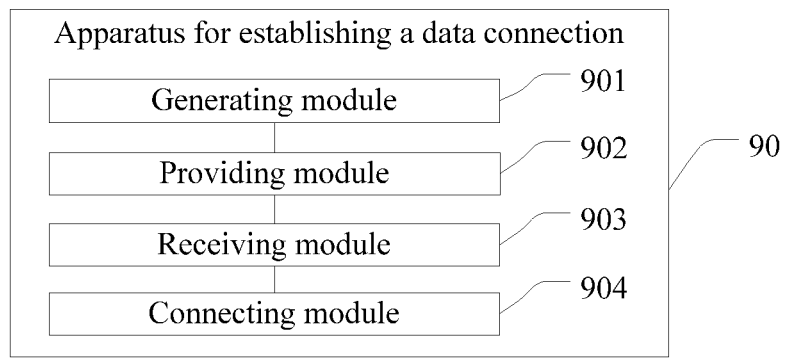
FIG. 9 is a schematic structural diagram of still another apparatus for establishing a data connection according to an embodiment of the present invention.

As shown in FIG. 9, an embodiment of the present invention provides an apparatus 90 for establishing a data connection, where the apparatus includes a generating module 901, a providing module 902, a receiving module 903, and a connecting module 904. The apparatus may be a transmitter device, and specifically, the transmitter device may be a device having transmission functions.

The generating module 901 is configured to generate connection information and provide the connection information to the providing module 902, where the connection information includes transmission functions of the transmitter device and authentication information of the transmission functions.

Specifically, the generating module 901 in the transmitter device generates a connection message that includes the connection information; or the generating module 901 generates a two-dimensional code that includes the connection information, where the two-dimensional code is used for a receiver device to obtain the connection information by scanning.

The providing module 902 is configured to provide the connection information to the receiver device.

The receiving module 903 is configured to receive an authentication message sent by the receiver device and provide the authentication message to the connecting module 904, where the authentication message includes the authentication information.

The connecting module 904 is configured to establish a connection of a target transmission function with the receiver device according to the authentication message.

Figure 10:
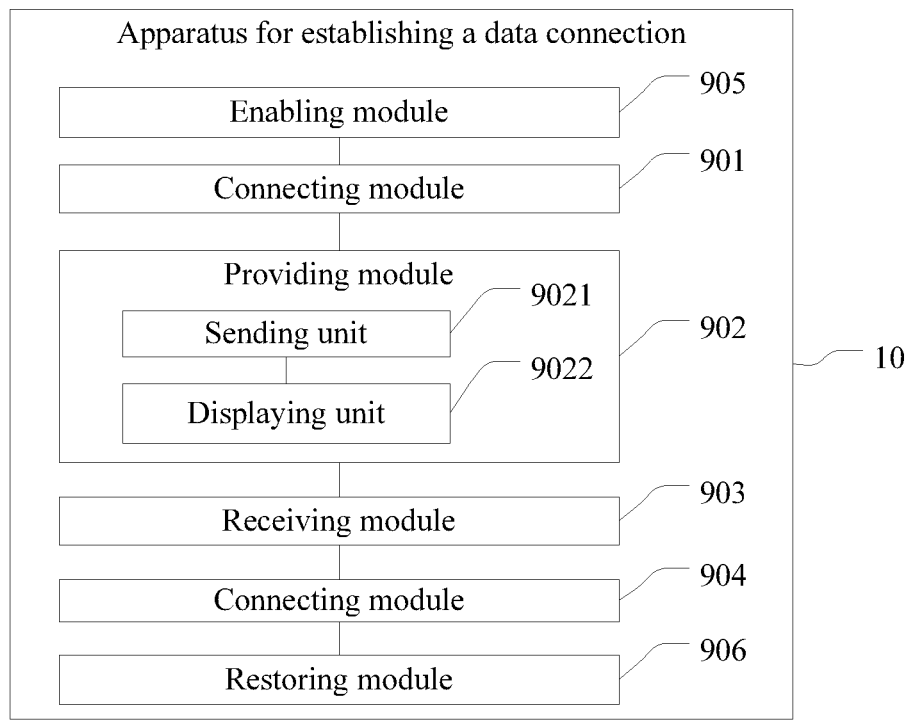
FIG. 10 is a schematic structural diagram of still another apparatus for establishing a data connection according to an embodiment of the present invention.

Further, as shown in FIG. 10, an apparatus 10 for establishing a data connection further includes an enabling module 905 and a restoring module 906, and the providing module 902 includes a sending unit 9021 and a displaying unit 9022.

Optionally, the enabling module 905 is configured to enable the transmission functions; and the restoring module 906 is configured to restore transmission function states of the transmission functions except the target transmission function to an initial state.

Further, the receiving module 903 is further configured to receive an enable message sent by the receiver device, where the enable message includes notification information that the receiver device has enabled the target transmission function; and then the enabling module 905 enables the target transmission function according to the enable message.

Further, it should be noted that the sending unit 9021 included in the providing module 902 is configured to send the connection message to the receiver device when the transmitter device generates the connection message; and the displaying unit 9022 is configured to display the two-dimensional code on a display screen when the transmitter device generates the two-dimensional code.

It is understandable that another apparatus for establishing a data connection according to the present invention includes the modules in the apparatus 10 for establishing a data connection, but the providing module 902 includes only the sending unit 9021 or the displaying unit 9022.

It should be noted that, in the apparatus 90 shown in FIG. 9 and the apparatus 10 shown in FIG. 10, because content such as specific implementation processes of the modules and information interaction between the modules is based on the same inventive idea as the method embodiments of the present invention, reference may be made to the method embodiments, and details are not repeated herein.

The apparatus for establishing a data connection according to this embodiment of the present invention can implement automatic determination of a transmission function according to transmission functions of electronic devices to perform data transmission and improve user experience.

It should be noted that this embodiment of the present invention may further provide an apparatus for establishing a data connection, where the apparatus includes the modules in the apparatus 70, apparatus 80, apparatus 90, and apparatus 10. For detailed description, reference may be made to FIG. 7 to FIG. 10, and details are not repeated herein.

Figure 11:
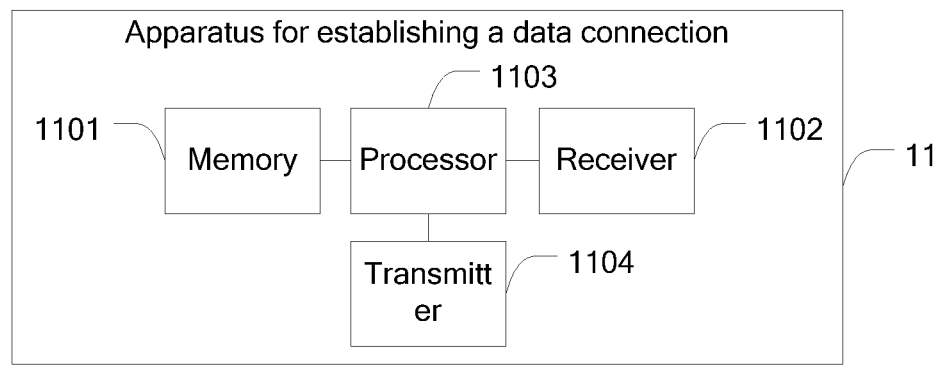
FIG. 11 is a schematic structural diagram of still another apparatus for establishing a data connection according to an embodiment of the present invention.

As shown in FIG. 11, an embodiment of the present invention provides an apparatus 11 for establishing a data connection, where the apparatus includes a memory 1101, a receiver 1102, a processor 1103, and a transmitter 1104. The apparatus may be a receiver device, and specifically, the receiver device may be a device having transmission functions.

The memory 1101 is configured to store information including a program routine.

The memory 1101 may be a read-only memory (ROM), a static storage device, a dynamic storage device, or a random-access memory (RAM). The memory 1101 can store an operating system and application programs. When the technical solutions provided in this embodiment of the present invention are implemented by software or firmware, program codes for implementing the technical solutions provided in this embodiment of the present invention are stored in the memory 1101 and executed by the processor 1103.

The receiver 1102 is configured to obtain connection information of a transmitter device, where the connection information includes transmission functions of the transmitter device and authentication information of the transmission functions.

Specifically, the receiver 1102 may receive a connection message that is sent by the transmitter device and includes the connection information; and/or the receiver 1102 may further obtain a two-dimensional code that is generated by the transmitter device and includes the connection information.

The processor 1103 may adopt a universal central processing unit (CPU), a microprocessor, an application specific integrated circuit (ASIC), or one or more integrated circuits to execute a related program, so as to implement the technical solutions provided in this embodiment of the present invention.

Specifically, the receiver 1102 obtains the connection information sent by the transmitter device and provides the connection information to the processor 1103. The processor 1103 is coupled with the memory 1101, the receiver 1102, and the transmitter 1104, is configured to control execution of the program routine, and is specifically configured to enable a target transmission function according to transmission function priorities obtained in advance, the transmission functions of the transmitter device, and transmission functions of the receiver device.

The transmitter 1104 is configured to send an authentication message to the transmitter device through the target transmission function, where the authentication message includes the authentication information.

The processor 1103 is further configured to establish a connection of the target transmission function with the transmitter device.

It should be noted that, only when the transmitter device and the apparatus both have an NFC function, the transmitter 1104 can send an enable message to the transmitter device through the NFC transmission function.

After the transmitter 1104 sends the enable message to the transmitter device, when a time interval from sending the enable message is a preset time, the processor 1103 starts to search for a device that has enabled the target transmission function. When the processor 1103 finds the device that has enabled the target transmission function, the transmitter 1104 sends, through the target transmission function, authentication information of the target transmission function to the device that has enabled the target transmission function. The preset time may be in seconds, and the apparatus does not limit a range of the preset time. For example, the preset time may be 1 s, that is, 1 s after the transmitter 1104 sends the enable message to the transmitter device, the processor 1103 starts to search for the device that has enabled the target transmission function. If the processor 1103 does not find the device that has enabled the target transmission function at this time, or no response is received from the device after the transmitter 1104 sends the authentication information of the target transmission function to the device that has enabled the target transmission function, the processor 1103 may continue to search for a device that has enabled the target transmission function, and then the transmitter 1104 sends the authentication information corresponding to the target transmission function to the newly found device that has enabled the target transmission function, until the apparatus and the transmitter device are successfully connected.

It should be noted that, in the apparatus shown in FIG. 11, because content such as specific implementation processes of the modules and information interaction between the modules is based on the same inventive idea as the method embodiments of the present invention, reference may be made to the method embodiments, and details are not repeated herein.

The apparatus for establishing a data connection according to this embodiment of the present invention can implement automatic determination of a transmission function according to transmission functions of electronic devices to perform data transmission and improve user experience.

Figure 12:
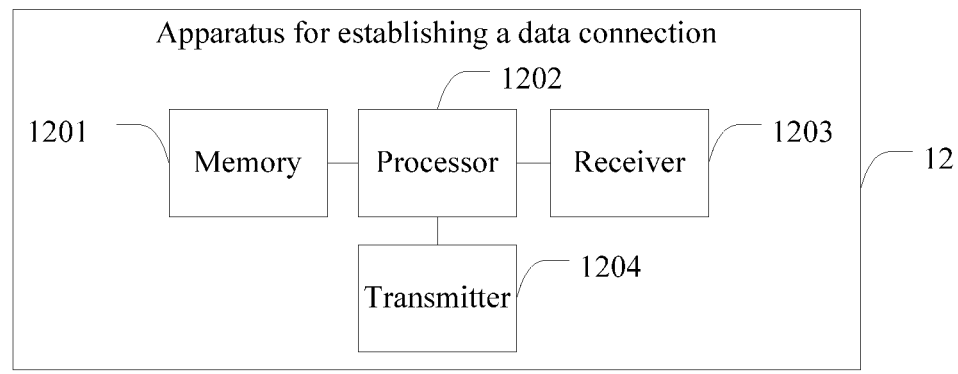
FIG. 12 is a schematic structural diagram of still another apparatus for establishing a data connection according to an embodiment of the present invention.

As shown in FIG. 12, an embodiment of the present invention provides another apparatus 12 for establishing a data connection, where the apparatus includes a memory 1201, a processor 1202, a receiver 1203, and a transmitter 1204. The apparatus may be a transmitter device, and specifically, the transmitter device may be a device having transmission functions.

The memory 1201 is configured to store information including a program routine.

The processor 1202 is coupled with the memory 1201, the receiver 1203, and the transmitter 1204, is configured to control execution of the program routine, and is specifically configured to generate connection information, where the connection information includes transmission functions of the transmitter device and authentication information of the transmission functions.

Specifically, the processor 1202 in the transmitter device generates a connection message that includes the connection information; or the processor 1202 generates a two-dimensional code that includes the connection information, where the two-dimensional code is used for a receiver device to obtain the connection information by scanning.

The receiver 1203 is configured to receive an authentication message sent by the receiver device and provide the authentication message to the processor 1202, where the authentication message includes the authentication information.

The processor 1202 is further configured to establish a connection of a target transmission function with the receiver device according to the authentication message.

Optionally, the processor 1202 is further configured to enable the transmission functions. Then, after the receiver 1203 receives the authentication message, the processor 1202 restores transmission function states of the transmission functions except the target transmission function to an initial state.

Optionally, the receiver 1203 receives an enable message sent by the receiver device, and then the processor 1202 enables the target transmission function.

The enable message includes notification information that the receiver device has enabled the target transmission function.

It should be noted that, in the apparatus 12 shown in FIG. 12, because content such as specific implementation processes of the modules and information interaction between the modules is based on the same inventive idea as the method embodiments of the present invention, reference may be made to the method embodiments, and details are not repeated herein.

The apparatus for establishing a data connection according to this embodiment of the present invention can implement automatic determination of a transmission mode according to transmission functions of electronic devices to perform data transmission and improve user experience.

It should be noted that this embodiment of the present invention may provide an apparatus for establishing a data connection, where the apparatus includes the modules in FIG. 11 and FIG. 12. For detailed description, reference may be made to FIG. 7 to FIG. 10, and details are not repeated herein.

Figure 13:
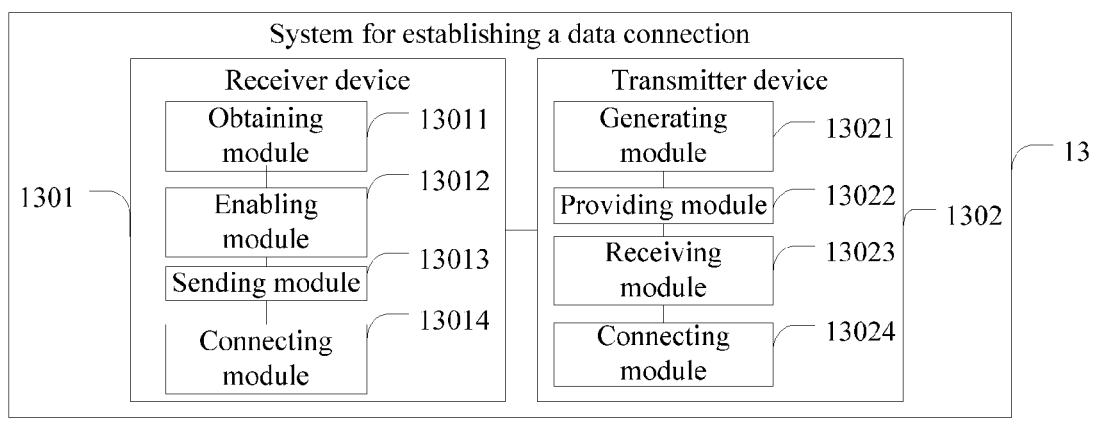
FIG. 13 is a schematic structural diagram of a system for establishing a data connection according to an embodiment of the present invention.

As shown in FIG. 13, an embodiment of the present invention provides a system 13 for establishing a data connection, where the system 13 for establishing a data connection includes a receiver device 1301 and a transmitter device 1302.

The receiver device 1301 includes an obtaining module 13011, an enabling module 13012, a sending module 13013, and a connecting module 13014; and the transmitter device 1302 includes a generating module 13021, a providing module 13022, a receiving module 13023, and a connecting module 13024.

Specifically, the generating module 13021 included in the transmitter device 1302 generates connection information, where the connection information includes transmission functions of the transmitter device 1302 and authentication information of the transmission functions.

The providing module 13022 included in the transmitter device 1302 provides the connection information to the obtaining module 13011 included in the receiver device 1301.

The obtaining module 13011 included in the receiver device 1301 obtains the connection information provided by the providing module 13022 included in the transmitter device 1302.

The enabling module 13012 included in the receiver device 1301 enables a target transmission function according to transmission function priorities obtained in advance, states of the transmission functions of the transmitter device 1302, and states of transmission functions of the receiver device 1301.

The sending module 13013 included in the receiver device 1301 sends, through the target transmission function, an authentication message to the receiving module 13023 included in the transmitter device 1302, where the authentication message includes the authentication information.

The receiving module 13023 included in the transmitter device 1302 receives the authentication message sent by the sending module 13013 included in the receiver device 1301.

The connecting module 13024 included in the transmitter device 1302 establishes, according to the authentication message, a connection of the target transmission function with the connecting module 13014 included in the receiver device 1301.

It should be noted that, in the system 13 shown in FIG. 13, because content such as specific implementation processes of the modules and information interaction between the modules is based on the same inventive idea as the method embodiments of the present invention, reference may be made to the method embodiments, and details are not repeated herein.

The system for establishing a data connection according to this embodiment of the present invention can implement automatic determination of a transmission mode according to transmission functions of electronic devices to perform data transmission and improve user experience.

It can be clearly understood by a person skilled in the art that, for the purpose of convenient and brief description, division of the foregoing function modules is taken as an example for illustration, in actual implementation, the foregoing functions can be allocated to different modules and implemented according to the need, that is, inner structure of the apparatus is divided into different function modules to implement all or part of the functions described above. For a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in the form of a software product. The software product is stored in a storage medium and includes several instructions for instructing a computer device (which may be a personal computer, a server, or a network device) or a processor to perform all or a part of the steps of the methods described in the embodiments of the present invention. The foregoing storage medium includes: any medium that can store program code, such as a universal serial bus (USB) flash drive, a removable hard disk, a ROM, a RAM, a magnetic disc, or an optical disc.

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for establishing a data connection, comprising:
    obtaining, by a receiver device, connection information of a transmitter device, wherein the connection information comprises transmission functions of the transmitter device and authentication information of the transmission functions;
    enabling, by the receiver device, a target transmission function according to transmission function priorities obtained in advance, the transmission functions of the transmitter device, and transmission functions of the receiver device; and
    sending, by the receiver device, an authentication message to the transmitter device through the target transmission function, wherein the authentication message comprises the authentication information such that the receiver device and the transmitter device establish a connection of the target transmission function,
    wherein a method for obtaining the transmission function priorities comprises:
    obtaining, by the receiver device, the priorities provided by the transmitter device; or
    obtaining, by the receiver device, the priorities stored by the receiver device,
    wherein when obtaining, by the receiver device, the connection information of the transmitter device comprises receiving, by the receiver device, the connection message that is sent by the transmitter device and comprises the connection information,
    wherein after enabling the target transmission function and before sending, by the receiver device, the authentication message to the transmitter device through the target transmission function, the method further comprises sending, by the receiver device, an enable message to the transmitter device, and
    wherein the enable message comprises the target transmission function such that the transmitter device enables the target transmission function.

2. The method according to claim 1, wherein obtaining, by the receiver device, the connection information of the transmitter device comprises:
    receiving, by the receiver device, a connection message that is sent by the transmitter device and comprises the connection information; or
    obtaining, by the receiver device, a two-dimensional code that is generated by the transmitter device and comprises the connection information.

3. The method according to claim 1, wherein sending, by the receiver device, the authentication message to the transmitter device through the target transmission function comprises:
    searching, by the receiver device, for a device that has enabled the target transmission function, wherein the device that has enabled the target transmission function comprises the transmitter device; and
    sending, by the receiver device through the target transmission function, authentication information of the target transmission function to the device that has enabled the target transmission function.

4. A method for establishing a data connection, comprising:
    generating, by a transmitter device, connection information, wherein the connection information comprises transmission functions of the transmitter device and authentication information of the transmission functions;
    providing, by the transmitter device, the connection information to a receiver device;
    receiving, by the transmitter device, an authentication message sent by the receiver device, wherein the authentication message comprises the authentication information; and
    establishing, by the transmitter device, a connection of a target transmission function with the receiver device according to the authentication message,
    wherein generating, by the transmitter device, the connection information comprises generating, by the transmitter device, a connection message that comprises the connection information,
    wherein when the transmitter device generates the connection message, providing, by the transmitter device, the connection information to the receiver device comprises sending, by the transmitter device, the connection message to the receiver device, or wherein generating, by the transmitter device, the connection information comprises generating, by the transmitter device, a two-dimensional code that comprises the connection information,
    wherein the two-dimensional code is used for the receiver device to obtain the connection information by scanning,
    wherein when the transmitter device generates the two-dimensional code, providing, by the transmitter device, the connection information to the receiver device comprises displaying, by the transmitter device, the two-dimensional code,
    wherein when generating, by the transmitter device, the connection information comprises generating, by the transmitter device, the two-dimensional code, before providing, by the transmitter device, the connection information to the receiver device, the method further comprises:
    enabling, by the transmitter device, the transmission functions; and
    after receiving, by the transmitter device, the authentication message sent by the receiver device, the method further comprises:
    restoring, by the transmitter device, transmission function states of the transmission functions except the target transmission function to an initial state; or
    wherein when generating, by the transmitter device, the connection information comprises generating, by the transmitter device, the connection message that comprises the connection information, before receiving, by the transmitter device, the authentication message sent by the receiver device, the method further comprises:

receiving, by the transmitter device, an enable message sent by the receiver device, wherein the enable message comprises notification information that the receiver device has enabled the target transmission function; and enabling, by the transmitter device, the target transmission function according to the enable message.

5. The method according to claim 4, wherein the connection information further comprises priorities of the transmission functions.

6. An apparatus for establishing a data connection, comprising:

an obtaining module configured to obtain connection information of a transmitter device, wherein the connection information comprises transmission functions of the transmitter device and authentication information of the transmission functions;

an enabling module configured to enable a target transmission function according to transmission function priorities obtained in advance, the transmission functions of the transmitter device, and transmission functions of a receiver device;

a sending module configured to send an authentication message to the transmitter device through the target transmission function, wherein the authentication message comprises the authentication information; and a connecting module configured to establish a connection of the target transmission function with the transmitter device, wherein the obtaining module is configured to receive a connection message that is sent by the transmitter device and comprises the connection information, or is configured to obtain a two-dimensional code that is generated by the transmitter device and comprises the connection information, wherein the sending module is configured to send an enable message to the transmitter device, wherein the enable message comprises the target transmission function such that the transmitter device enables the target transmission function, wherein the apparatus further comprises a searching module configured for the receiver device to search for a device that has enabled the target transmission function, wherein the device that has enabled the target transmission function comprises the transmitter device, and wherein the sending module is further configured to send, through the target transmission function, authentication information of the target transmission function to the device that has enabled the target transmission function.

7. The apparatus according to claim 6, wherein the obtaining module is configured to obtain the priorities provided by the transmitter device, and wherein the obtaining module is further configured for the receiver device to obtain the priorities stored by the receiver device.

8. A system for establishing a data connection, comprising:

a receiver device; and a transmitter device, wherein the receiver device comprises an obtaining module, an enabling module, a sending module, and a connecting module, wherein the transmitter device comprises a generating module, a providing module, a receiving module, and a connecting module, wherein the generating module comprised in the transmitter device generates connection information, wherein the connection information comprises transmission functions of the transmitter device and authentication information of the transmission functions, wherein the providing module comprised in the transmitter device provides the connection information to the obtaining module comprised in the receiver device, wherein the obtaining module comprised in the receiver device obtains the connection information provided by the providing module comprised in the transmitter device, wherein the enabling module comprised in the receiver device enables a target transmission function according to transmission function priorities obtained in advance, states of the transmission functions of the transmitter device, and states of transmission functions of the receiver device, wherein the sending module comprised in the receiver device sends, through the target transmission function, an authentication message to the receiving module comprised in the transmitter device, wherein the authentication message comprises the authentication information, wherein the receiving module comprised in the transmitter device receives the authentication message sent by the sending module comprised in the receiver device, and wherein the connecting module comprised in the transmitter device establishes, according to the authentication message, a connection of the target transmission function with the connecting module comprised in the receiver device.

\* \* \* \* \*

UNITED STATES PATENT AND TRADEMARK OFFICE
CERTIFICATE OF CORRECTION

| | | |
|---|---|---|
| PATENT NO. | : 9,264,901 B2 | Page 1 of 1 |
| APPLICATION NO. | : 14/324488 | |
| DATED | : February 16, 2016 | |
| INVENTOR(S) | : Duan et al. | |

It is certified that error appears in the above-identified patent and that said Letters Patent is hereby corrected as shown below:

On the title page item [30], insert:

--Jun. 28, 2013 (CN) .............................. 201310270387.8--

Signed and Sealed this
Third Day of May, 2016

Michelle K. Lee
*Director of the United States Patent and Trademark Office*